US012699189B2

(12) United States Patent
Broumandan et al.

(10) Patent No.: US 12,699,189 B2
(45) Date of Patent: Aug. 4, 2026

(54) SYSTEMS, METHODS, AND MEDIA FOR ESTIMATING ONE OR MORE LINE BIASES FOR A MULTI-ANTENNA ARRAY

(71) Applicant: NovAtel Inc., Calgary (CA)

(72) Inventors: Ali Broumandan, Calgary (CA); Vahid Dehghanian, Calgary (CA); Isabelle Tremblay, Calgary (CA)

(73) Assignee: NovAtel Inc., Calgary (CA)

( * ) Notice: Subject to any disclaimer, the term of this patent is extended or adjusted under 35 U.S.C. 154(b) by 234 days.

(21) Appl. No.: 18/408,209

(22) Filed: Jan. 9, 2024

(65) Prior Publication Data

US 2025/0224519 A1 Jul. 10, 2025

(51) Int. Cl.
G01S 19/23 (2010.01)
G01S 19/54 (2010.01)

(52) U.S. Cl.
CPC ............ G01S 19/235 (2013.01); G01S 19/54 (2013.01)

(58) Field of Classification Search
None
See application file for complete search history.

(56) References Cited

U.S. PATENT DOCUMENTS

| | | | | | |
|---|---|---|---|---|---|
| 6,023,240 | A | * | 2/2000 | Sutton | .................... G01S 5/0247 342/357.38 |
| 6,061,631 | A | | 5/2000 | Zhang | |
| 6,101,430 | A | * | 8/2000 | Fuller | ..................... G01S 19/55 701/13 |
| 6,163,754 | A | | 12/2000 | Zhang et al. | |
| 6,211,821 | B1 | | 4/2001 | Ford | |
| 6,313,788 | B1 | * | 11/2001 | Wilson | .................. G01S 5/0247 342/357.68 |
| 6,421,003 | B1 | * | 7/2002 | Riley | ..................... G01S 19/54 342/357.38 |
| 7,489,270 | B2 | | 2/2009 | Lawrence et al. | |
| 7,605,749 | B2 | * | 10/2009 | Lawrence | ............... G01S 19/32 342/357.42 |
| 8,633,854 | B2 | | 1/2014 | Fenton | |

(Continued)

OTHER PUBLICATIONS

Ford et al., "Beeline RT20—a Compact, Medium Precision Positioning system with an Attitude." Sep. 1997, 9 pages.

(Continued)

*Primary Examiner* — Bernarr E Gregory

(74) *Attorney, Agent, or Firm* — Cesari and McKenna, LLP; Omar M. Wadhwa

(57) ABSTRACT

Techniques are provided for estimating a line bias of a multi-antenna array. Diff-carrier phase (CP) values may be calculated based on navigation signals received at two antennas of the multi-antenna array. An integer portion may be removed from each diff-CP value. A baseline vector and a fine line bias estimate may be calculated for each of the plurality of candidate line bias value by executing an algorithm that uses each candidate with fractional diff-CP measurements that are corrected for the candidate that is being tested. Output of a test statistic method (e.g., sum of residual squares) and the smallest fine line bias estimate may be used to identify a particular candidate line bias value. The smallest fine line bias estimate may be added to the chosen candidate to calculate the line bias between the two antennas. Calibration of the multi-antenna array and attitude determination can be jointly performed.

21 Claims, 4 Drawing Sheets
</section>

(56) References Cited

U.S. PATENT DOCUMENTS

| | | | | |
|---|---|---|---|---|
| 8,638,257 | B2 | 1/2014 | Fenton | |
| 2002/0169578 | A1* | 11/2002 | Yang | G01S 19/30 |
| | | | | 702/152 |
| 2006/0244656 | A1* | 11/2006 | Lawrence | G01S 19/44 |
| | | | | 342/357.29 |
| 2012/0163419 | A1* | 6/2012 | Seeger | G01S 19/04 |
| | | | | 375/144 |

OTHER PUBLICATIONS

European Search Report completed Aug. 20, 2024 for corresponding EP Application No. EP 24 16 2477 mailed Sep. 2, 2024, 7 pages.
Yang Chun et al., "Constrained Optimization for Joint Estimation of Channel Biases and Angles of Arrival for Small GPS Antenna Arrays," 60th AM—Proceedings of Hte 60th Annual Meeting of the Institute of Navigation, the Institute of Navigation, 8551 Rixlew Lane Suite 360 Manassas, VA 20109, Jun. 9, 2004, pp. 548-559.

* cited by examiner

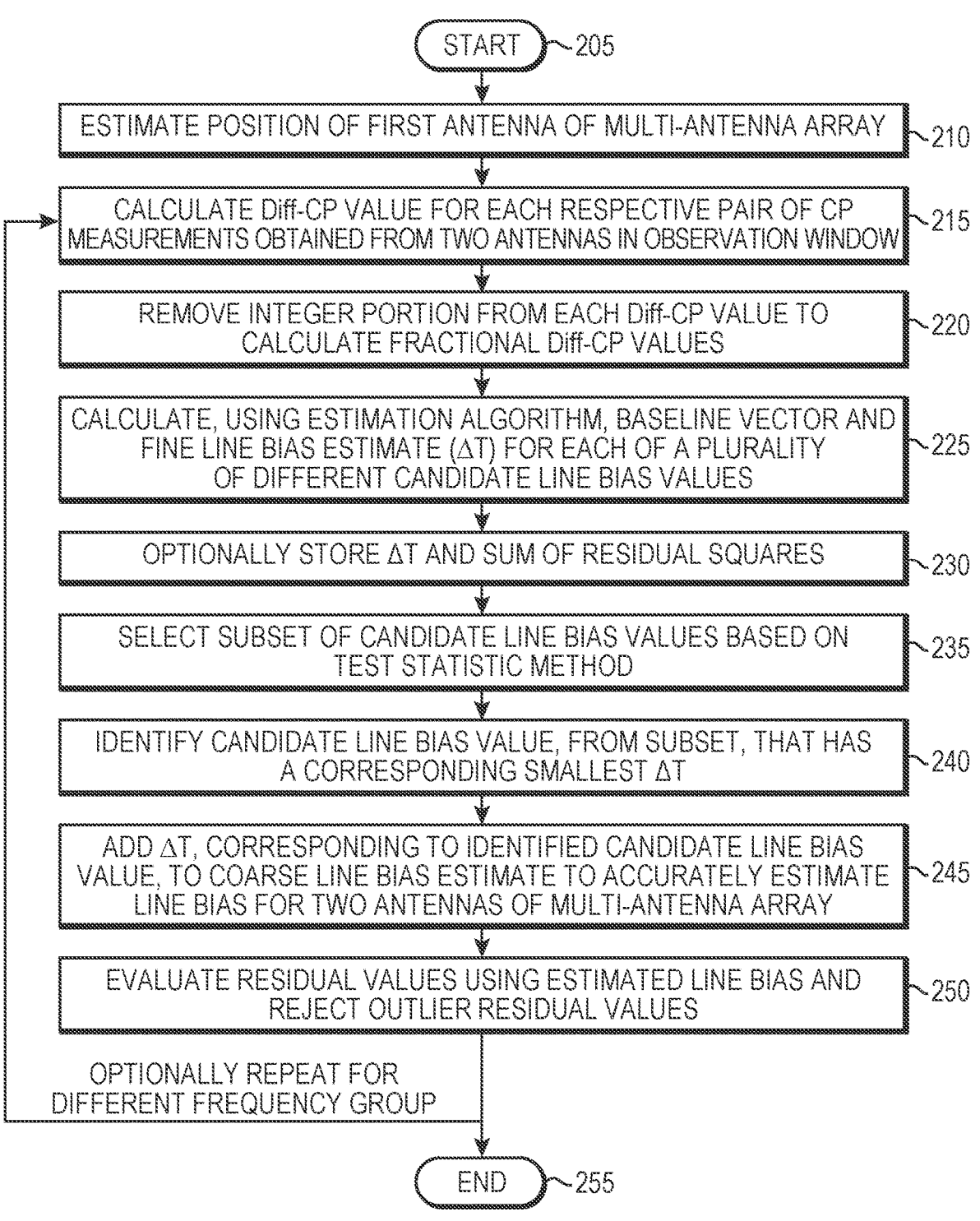

START ~205

ESTIMATE POSITION OF FIRST ANTENNA OF MULTI-ANTENNA ARRAY ~210

CALCULATE Diff-CP VALUE FOR EACH RESPECTIVE PAIR OF CP MEASUREMENTS OBTAINED FROM TWO ANTENNAS IN OBSERVATION WINDOW ~215

REMOVE INTEGER PORTION FROM EACH Diff-CP VALUE TO CALCULATE FRACTIONAL Diff-CP VALUES ~220

CALCULATE, USING ESTIMATION ALGORITHM, BASELINE VECTOR AND FINE LINE BIAS ESTIMATE (ΔT) FOR EACH OF A PLURALITY OF DIFFERENT CANDIDATE LINE BIAS VALUES ~225

OPTIONALLY STORE ΔT AND SUM OF RESIDUAL SQUARES ~230

SELECT SUBSET OF CANDIDATE LINE BIAS VALUES BASED ON TEST STATISTIC METHOD ~235

IDENTIFY CANDIDATE LINE BIAS VALUE, FROM SUBSET, THAT HAS A CORRESPONDING SMALLEST ΔT ~240

ADD ΔT, CORRESPONDING TO IDENTIFIED CANDIDATE LINE BIAS VALUE, TO COARSE LINE BIAS ESTIMATE TO ACCURATELY ESTIMATE LINE BIAS FOR TWO ANTENNAS OF MULTI-ANTENNA ARRAY ~245

EVALUATE RESIDUAL VALUES USING ESTIMATED LINE BIAS AND REJECT OUTLIER RESIDUAL VALUES ~250

OPTIONALLY REPEAT FOR DIFFERENT FREQUENCY GROUP

END ~255

FIG. 2

SYSTEMS, METHODS, AND MEDIA FOR ESTIMATING ONE OR MORE LINE BIASES FOR A MULTI-ANTENNA ARRAY

BACKGROUND

Technical Field

The invention relates generally to multi-antenna arrays, and in particular, to systems, methods, and media for estimating one or more line biases for a multi-antenna array.

Background Information

Multi-antenna wireless systems, such as Global Navigation Satellite System (GNSS) receiver systems, can implement various spatial processing applications that include, but are not limited to, direction of arrival estimation, beamforming determination, and attitude determination. To accurately implement these applications, conventional systems and techniques require that the multi-antenna array be calibrated beforehand. Multi-antenna array calibration may include two parameters. One parameter may be a mismatch relating to a signal delay term, known as a line bias, which may arise from a variety of factors including, but not limited to, radio frequency (RF) hardware, cables, etc. The other parameter may be an uncertainty based on relative phase and gain responses of the antennas within the array. The first calibration parameter is frequency dependent and may vary because of the aging of the system components and changes in temperature. The first parameter is, however, independent of the angle of arrival of the signals received at the antennas. The second parameter is dependent on the signal Direction of Arrival (DoA) which is a function of azimuth and elevation angles in the antenna reference frame.

With conventional systems and techniques, particular information must be known for calibrating a multi-antenna array, e.g., adjusting/tuning the two above-described calibration parameters. Such information typically includes the relative position of the antenna elements of the array (i.e., baseline vector) and the attitude of the array relative to the reference frame. The DoA of the signals received at the antenna is also assumed to be available. With this information known, conventional systems and techniques can calibrate the multi-antenna array, e.g., at start-up, to accurately implement the various spatial processing applications (e.g., direction of arrival estimation, beamforming determination, and attitude determination). However, in many situations such information, and specifically the attitude of the array, is unavailable and unknown. If such information is unknown at, for example, startup, conventional systems and techniques cannot calibrate the multi-antenna array. As a result, conventional systems and techniques cannot effectively implement the various spatial processing applications.

A conventional solution to the above-described problem is to determine the attitude of the multi-antenna array using short-baseline real time kinematic (RTK) processing techniques based on, for example, double-differenced phase observations. However, this double-differencing approach adds extra complexity, and also requires extra processing resources. Therefore, although the short-baseline RTK technique may determine the attitude parameter to then calibrate a multi-antenna array, the short-baseline RTK processing technique has its drawbacks.

Therefore, what is needed is a system and/or technique that can efficiently and accurately determine the line bias of the multi-antenna array, without knowing the antenna attitude, such that the multi-antenna array can be calibrated.

SUMMARY

Techniques are provided for estimating one or more line biases of a multi-antenna array according to one or more embodiments as described herein. As will be described in further detail below, a line bias can be estimated without knowing the attitude of the multi-antenna array, and the multi-antenna array can be calibrated using the estimated line bias such that one or more spatial processing applications can be implemented.

In an embodiment, a processor (e.g., a processor executing a line bias module) may calculate differenced accumulated carrier phase measurements (e.g., Diff-CP) for each respective pair of carrier phase measurements obtained from two antennas of the multi-antenna array in an observation window (i.e., time frame). In an embodiment, the Diff-CP measurements may be differenced accumulated doppler range measurements. In an embodiment, the spacing between the two antennas may be less than half a carrier wavelength. The processor may remove the integer ambiguity from each Diff-CP value to calculate fractional Diff-CP values.

The processor may utilize an estimation algorithm to test a plurality of different candidate coarse line bias values to identify a particular coarse candidate line bias value as being the estimation of the coarse line bias between the two antennas. To that end, the processor may calculate, using an estimation algorithm, a baseline vector and fine line bias estimate ($\Delta T$) for each of the plurality of different candidate coarse line bias values that is being tested.

The processor may utilize any of a plurality of different test statistic methods to select one or more candidate coarse line bias values. For example, such test statistic methods may include, but are not limited to, solution separation methods, residual-based approaches (e.g., a sum of squared residuals-based method), etc. In some embodiments the processor may identify a particular candidate coarse line bias value (e.g., a coarse line bias component), of the one or more selected candidate coarse line bias values, that has the smallest $\Delta T$.

The processor may add $\Delta T$ to the identified coarse line bias component to estimate the line bias between the two antennas of the multi-antenna array. The processor may similarly estimate the line bias between any two selected antennas of a multi-antenna array that has n antennas. Therefore, the processor can estimate the line bias, between any two antennas of the multi-antenna array, without knowing the attitude of the antenna according to the one or more embodiments as described herein.

The processor may also jointly calibrate the multi-antenna array and estimate the attitude of the multi-antenna array. Specifically, the processor may calibrate the multi-antenna array using the line bias, estimated according to the one or more embodiments as described herein, and the DoA of the signals received at the antennas. A navigation receiver may implement one or more spatial processing applications based on the signals received at the multi-antenna array that is calibrated according to the one or more embodiments as described herein.

BRIEF DESCRIPTION OF THE DRAWINGS

The description below refers to the accompanying drawings, of which:

FIG. 2 is a flow diagram of a sequence of steps for determining, i.e., estimating, one or more line biases of a multi-antenna array according to the one or more embodiments as described herein.

DETAILED DESCRIPTION OF AN ILLUSTRATIVE EMBODIMENT

Figure 1A:
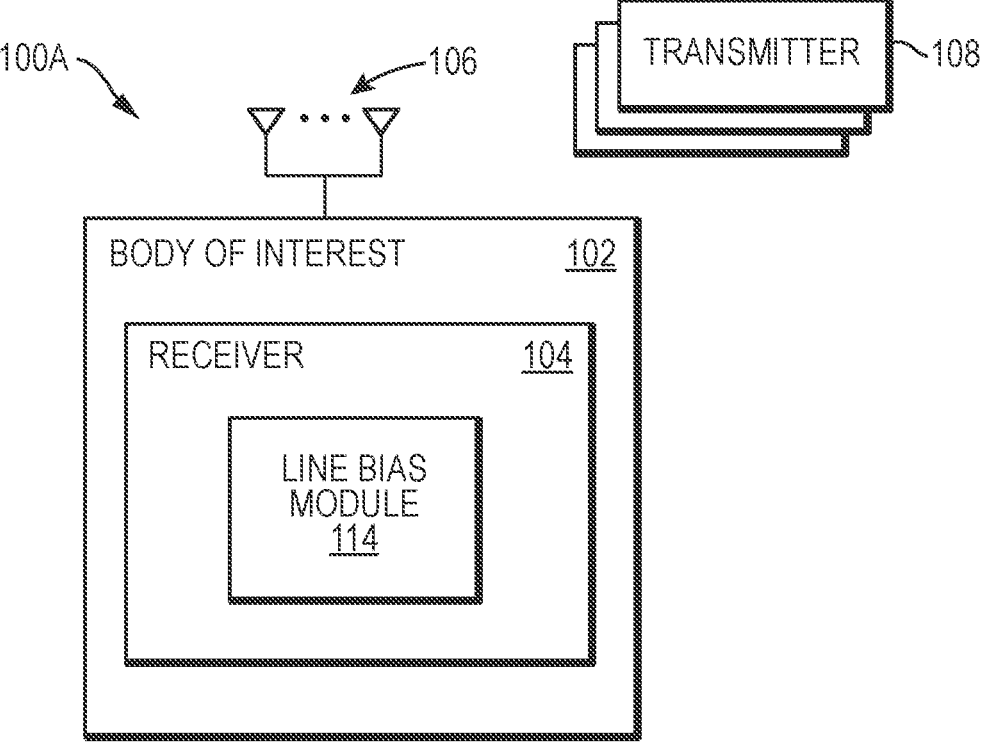
FIG. 1A is an illustration of an example system environment for real-time, i.e., near real-time, estimation of one or more line biases for a multi-antenna array according to the one or more embodiments as described herein.

FIG. 1A is an illustration of an example system environment 100A for real-time, i.e., near real-time, estimation of one or more line biases for a multi-antenna array according to the one or more embodiments as described herein. System environment 100A includes a body of interest 102, e.g., a moving vehicle, a stationary object, etc. Coupled to the body of interest 102 may be a receiver 104 and a multi-antenna array 106. The ellipsis between the two antenna elements of multi-antenna array 106 is used to indicate that multi-antenna array 106 may include any number of a plurality of antennas. Each of the plurality of antennas of multi-antenna array 106, which is coupled to the body of interest 102 and in communication with receiver 104, is configured to receive one or more signals (e.g., navigation signals) from one or more transmitters 108.

Calibration of multi-antenna array 106 may include calibrating two parameters. One parameter may be a line bias, i.e., line bias mismatch relating to antennas of the multi-antenna array 106. The other parameter may be (2) an uncertainty based on relative phase and gain responses of the antennas within the multi-antenna array 106. The first calibration parameter is frequency dependent and may vary because of the aging of the internal components and changes in temperature. The first parameter is, however, independent of the angle of arrival of the signals received at the antenna. The second parameter is dependent on the signal Direction of Arrival (DoA) which is a function of azimuth and elevation angles in the antenna body frame.

In an embodiment, the one or more transmitters 108 may be one or more Global Navigation Satellite System (GNSS) satellites that transmit one or more navigation signals, e.g., GNSS satellite signals (not shown). Although reference may be made to transmitters 108 being GNSS satellites transmitting GNSS satellite signals, it is expressly contemplated that the one or more embodiments as described herein may be utilized with any of a variety of different types of transmitters 108. For example, transmitters 108 may be terrestrial transmitters that transmit any of a variety of different navigation signals. As such, the description of transmitters 108 being GNSS satellites that transmit GNSS signals should be taken for illustrative purposes only.

Receiver 104 may, based on the reception of signals at multi-antenna array 106, produce raw measurements (e.g., GNSS raw measurements), such as pseudoranges, carrier phases (e.g., differenced carrier phase measurements), and Doppler velocities; position (e.g., GNSS position), velocity (e.g., GNSS velocity), attitude, and time (e.g., GNSS time), position covariance, time covariance, and velocity covariance; and, as appropriate, GNSS observables.

Receiver 104 may implement one or more spatial processing applications based on the signals received at multi-antenna array 106 that is calibrated according to the one or more embodiments as described herein. The one or more spatial processing applications may include, but are not limited to, direction of arrival estimation, beamforming determination, attitude determination, etc. Receiver 104 may include processors, memory, storage, other hardware, software, and/or firmware (not shown).

As depicted in FIG. 1A, receiver 104 includes line bias module 114. Line bias module 114 may implement the one or more embodiments as described herein. Specifically, and as will be described in further detail below with relation to the flow diagram of FIG. 2, line bias module 114 may estimate a line bias between two antennas of multi-antenna array 106 without knowing the attitude of multi-antenna array 106. The line bias module 114 can estimate the line bias between any two selected antennas of a multi-antenna array that has n antennas. For example, a particular antenna of multi-antenna array 106 may act as a reference antenna and the line bias module 114 may determine the line bias between each other antenna and the reference antenna according to the one or more embodiments as described herein.

The estimated line bias can then be used for any of a variety of different applications (e.g., navigation applications) that may be related to multi-antenna array 106. For example, such applications may include, but are not limited to, calibration of multi-antenna array 106, direction finding, beamforming, attitude estimation, code and carrier multipath mitigation, fast and reliable Precise Point Positioning (PPP) solutions. Therefore, and by accurately and efficiently estimating the line bias without knowing the attitude of the multi-antenna array 106, the one or more embodiments as described herein provide an improvement in the existing technological field of multi-antenna arrays that receive navigation signals.

Further, and as will be described in further detail below with relation to the flow diagram of FIG. 3, line bias module 114 may jointly calibrate multi-antenna array 106 and determine the attitude of multi-antenna array 106. Therefore, the one or more embodiments as described herein can calibrate multi-antenna array 106 without knowing the attitude of the array, which may be required to be known by some conventional systems for multi-antenna array calibration. As such, the one or more embodiments as described herein also provide an improvement in the existing technological field of multi-antenna array calibration.

Although the one or more embodiments may describe line bias module 114 estimating the line bias, calibrating multi-antenna array 106, and determining the attitude of multi-antenna array 106, it is expressly contemplated that a different module may estimate the line bias, calibrate multi-antenna array 106, and determine the attitude of multi-antenna array 106. For example, line bias module 114 may estimate the line bias as described herein, while a different module (not shown) may calibrate the multi-antenna array 106 and determine the attitude of multi-antenna array 106. In an embodiment, line bias module 114 may be software, hardware, or a combination of software and hardware.

Figure 1B:
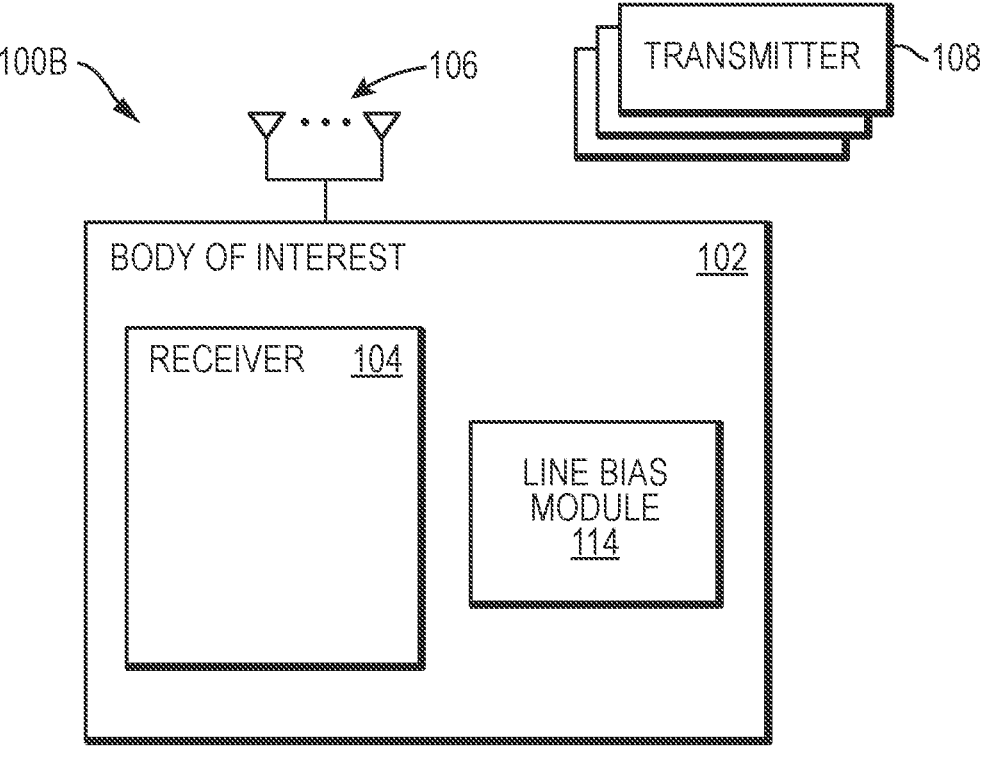
FIG. 1B is an illustration of an example different system environment for post-processing estimation of one or more line biases for a multi-antenna array according to the one or more embodiments as described herein.

FIG. 1B is an illustration of an example of a different system environment 100B for post-processing estimation of one or more line biases for a multi-antenna array according to the one or more embodiments as described herein. FIG. 1B is similar to FIG. 1A, however line bias module 114 of FIG. 1B is external to receiver 104 and coupled to the body of interest 102. Because line bias module 114 is external to receiver 104, line bias module 114 may receive measurements (e.g., differenced carrier phase measurements) from receiver 104 over a medium (e.g., network, cable, etc.) and then calculate the line bias for multi-antenna array 106.

Both system environments 100A and 100B are susceptible to line bias, also known as "line bias mismatch". A line bias may indicate a relative error between respective antennas of multi-antenna array 106. To that end, the line bias may be realized in the measurements obtained by receiver 104 based on the signals received at the respective antennas. Specifically, the line bias mismatch is a particular error/problem inherent with multi-array antennas that needs to be dealt with for multi-antenna-based applications.

The line bias may be caused by the elements along the paths between respective antennas that receive the navigation signals and the processing capabilities of receiver 104 that obtains/generates the measurements, such as carrier phase (hereinafter "CP") measurements. The elements along the paths may include, but are not limited to, the antennas, cables between respective antennas and receiver 104, active and passive components of receiver 104, etc.

As an illustrative example, let it be assumed that multi-antenna array 106 includes antennas A and B. Therefore, in this example, there are one or more elements along the path from antenna A to receiver 104 that generates CP measurements based on the signals received at antenna A. Additionally, there are one or more elements along the path from antenna B to receiver 104 that generates CP measurements based on the signals received at antenna B.

In an embodiment, the line bias is a value that indicates the relative impact caused by the elements along the paths from antenna A and B to receiver 104. For example, the line bias may be a value that indicates that the elements along the path from antenna A to receiver 104 have a longer delay on the received signals than the elements along the path from antenna B to receiver 104. Alternatively, the line bias value may indicate that the elements along the path from antenna B to receiver 104 have a longer delay on the received signals than the elements along the path from antenna A to receiver 104.

According to the one or more embodiments as described herein, and as will be described in further detail below in relation to the flow diagram of FIG. 2, one or more line biases (line bias mismatches) of multi-antenna array 106 can be accurately estimated without knowing the attitude (i.e., orientation) of multi-antenna array 106. As a result, multi-antenna array 106 can be calibrated using the estimated line bias, and without knowing the attitude of multi-antenna array 106, such that various spatial processing applications can be implemented by receiver 104.

FIG. 2 is a flow diagram of a sequence of steps for determining, i.e., estimating, one or more line biases of a multi-antenna array according to the one or more embodiments as described herein. The procedure 200 starts at step 205 and continues to step 210. At step 210, receiver 104 estimates a position of a first antenna of multi-antenna array 106.

For the example of FIG. 2, let it be assumed that multi-antenna array 106 includes antenna A and antenna B. In an embodiment, the spacing between each pair of antennas of multi-antenna array 106, for which a line bias is estimated, may be less than half a carrier wavelength. Therefore, and in the illustrative example, the spacing between antenna A and antenna B of multi-antenna array 106 may be less than half a carrier wavelength.

Although the example will be described with multi-antenna array 106 including two antennas, it is expressly contemplated that the one or more embodiments as described herein are applicable to multi-antenna arrays with any number of a plurality of antennas. To that end, the one or more embodiments as described herein can determine, e.g., estimate, a line bias for any respective pairs of antennas of multi-antenna array 106. For example, a particular antenna of multi-antenna array 106 may act as a reference antenna and the line bias module 114 may determine the line bias between each other antenna and the reference antenna as described below in relation to FIG. 2.

In this example, multi-antenna array 106 with antennas A and B is coupled to receiver 104 that has a single clock (not shown). However, it is expressly contemplated that antenna A and antenna B of multi-antenna array 106 may be coupled to different receivers (not shown) that share the same clock (not shown). As such, the reference to a single receiver 104 as described herein is for illustrative purposes only.

For this example, let it be assumed that receiver 104 estimates a position of antenna A. Receiver 104 may estimate the position of antenna A in any of a variety of different ways as known by those skilled in the art. For example, receiver 104 may estimate the position of antenna A from CP measurements that are obtained based on the navigation signals received at antenna A. In an embodiment, the CP measurements may be accumulated doppler range (ADR) measurements.

Although the examples as described herein may refer to CP measurements, it is expressly contemplated that the one or more embodiments as described herein can be used with any of a variety of different navigation measurements. For example, the one or more embodiments as described herein can be used with any of a variety of different CP measurements. In an embodiment, the estimated position of antenna A may include an x-coordinate, a y-coordinate, and a z-coordinate.

The procedure 200 continues to step 215. At step 215, receiver 104 calculates a differenced carrier phase (hereinafter "Diff-CP") value for each respective pair of CP measurements obtained from two antennas in an observation window (i.e., time frame).

For example, receiver 104 may obtain CP measurements based on the navigation signals received at antenna A and antenna B of multi-antenna array 106. In an embodiment, the navigation signals received at antennas A and B have the same carrier frequency. The following is Table 1 which illustrates an example of different groupings of signals with the same carrier frequency.

TABLE 1

| Group 1 | GPS L1CA/L1C, GAL E1, BDS B1C |
|---------|-------------------------------|
| Group 2 | BDS B1I |
| Group 3 | GPS L2P(Y)/L2C |
| Group 4 | GPS L5, GAL E5A, BDS B2A |
| Group 5 | GAL E5B, BDS B2B |

Let it be assumed that receiver 104 obtains 4 CP measurements, for each of antennas A and B, in the observation window based on navigation signals that are in the same carrier frequency of Group 1. Specifically, receiver 104 obtains 4 CP measurements based on the signals received at antenna A that are in the carrier frequency of Group 1. For the example as described herein, the CP measurements may illustratively be labeled as CP1A, CP2A, CP3A, and CP4A. Similarly, receiver 104 obtains 4 CP measurements based on the signals received at antenna B that are in the carrier frequency of Group 1. For the example as described herein, the CP measurements may be illustratively labeled as CP1B, CP2B, CP3B, and CP4B.

Therefore, in this example, receiver 104 calculates 4 Diff-CP values. Specifically, Diff-CP1 would be calculated as CP1A-CP1B. Diff-CP2 would be calculated as CP2A-CP2B. Diff-CP3 would be calculated as CP3A-CP3B, and Diff-CP4 would be calculated as CP4A-CP4B.

A Diff-CP measurement, according to the one or more embodiments as described herein, is a single difference measurement and can be written as:

$$\Delta\Phi_{B-A}^{j} = \Delta\rho_{B-A}^{j} + \lambda N_{B-A}^{j} + \Delta\varepsilon\left(\Phi_{MP_{B,A}}^{j}\right) + \Delta\varepsilon(\Phi_{rx}) + L_{B-A}, \qquad (1)$$

where $$\Delta\Phi_{B-A}^{j}$$

is the single difference value (e.g., Diff-CP) between two antennas (e.g., antennas A and B) to satellite j;

$$\Delta\rho_{B-A}^{j}$$

is the difference between the geometric ranges from the two antennas (e.g., antennas A and B) to satellite j;
$\lambda$ is the wavelength that is frequency dependent and based on the frequency of the received signals;

$$N_{B-A}^{j}$$

is the difference between integer ambiguity cycles from the two antennas (e.g., antennas A and B) to satellite j. Assuming the antenna separation is less than half a carrier wavelength, $$N_{B-A}^{j}$$

is zero and does not need to be estimated;

$$\Delta\varepsilon\left(\Phi_{MP_{B,A}}^{j}\right)$$

is the difference between phase multipath error for the two antennas (e.g., antennas A and B) based on signals received from satellite j;
$\Delta\varepsilon(\Phi_{rx})$ is the difference between receiver noise for the two antennas (e.g., antennas A and B); and
$L_{B-A}$ is the line bias between the two antennas (e.g., antennas A and B) and is an unknown parameter. Therefore, removing $\Delta\varepsilon(\Phi_{rx})$ and $$\Delta\varepsilon\left(\Phi_{MP_{B,A}}^{j}\right)$$

that are constant and assuming negligible values and $$N_{B-A}^{j}$$

that can be ignored, the single diff-CP measurement can be simplified and written as:

$$\Delta\Phi_{B-A}^{j} = \Delta\rho_{B-A}^{j} + L_{B-A} \qquad (2)$$

In an embodiment, $L_{B-A} = L_{coarse} + \Delta T$, where $L_{coarse}$ is the coarse component of the line bias, and $\Delta T$ is the fine line bias estimate.

Referring back to FIG. 2, the procedure 200 continues from step 215 to step 220. At step 220, module 114 removes the integer portion from each Diff-CP value to calculate fractional Diff-CP values. As explained above, the spacing between antenna A and antenna B may be less than half a carrier wavelength in an embodiment. Therefore, and in this embodiment, the difference between integer ambiguity cycles from the two antennas (e.g., antennas A and B) to satellite j is zero. As a result, the integer portion can be removed from the Diff-CP measurements at step 220.

To remove the integer portion, line bias module 114 may, for example, round the Diff-CP value to its nearest integer value and subtract the rounded integer value from the Diff-CP value. In an embodiment, the removal of the integer portion from a Diff-CP value may result in a value that is referred to as a fractional Diff-CP value.

As an example, let it be assumed that a Diff-CP value, of one of the Diff-CP values calculated in step 215, is 100.4. Line bias module 114 may round 100.4 to the integer value of 100 and then subtract the rounded integer value of 100 from 100.4. Thus, in this example, the fractional Diff-CP value is 0.4. As another example, let it be assumed that a Diff-CP value is 100.7. Line bias module 114 may round 100.7 to the integer value of 101 and then subtract the rounded integer value of 101 from 100.7. Thus, in this different example, the fractional Diff-CP value is −0.3.

Continuing with the example of 4 Diff-CP values in the observation window, line bias module 114 may compute 4 different fractional Diff-CP values. In an embodiment, each fractional Diff-CP value is greater than or equal to −0.5 and less than 0.5.

Referring back to FIG. 2, the procedure 200 continues from step 220 to step 225. At step 225, line bias module 114 calculates, using an estimation algorithm, a baseline vector and fine line bias estimate ($\Delta T$) for each of a plurality of different candidate line bias values. In an embodiment, each candidate line bias value being tested is a potential coarse component ($L_{coarse}$) of the line bias ($L_{B-A}$). Specifically, a particular candidate line bias value may be selected, as described in further detail below, and the selected candidate line bias value may represent the coarse component ($L_{coarse}$) of the line bias ($L_{B-A}$) that is estimated according to the one or more embodiment as described herein. As used herein, candidate line bias value and candidate coarse line bias value may be used interchangeably. In an embodiment, the calculated baseline vector and the calculated $\Delta T$ are estimated values.

As explained above with relation to formulas (1) and (2), the line bias ($L_{B-A}$) is an unknown parameter. Line bias module 114 may use a search range of candidate line bias values at a selected step size to test each candidate coarse line bias value by calculating a corresponding baseline vector and ΔT. For example, the search range may be from −0.5 to 0.4, inclusive of the range values, and the step size may be 0.1. Therefore, the different candidate line bias values used by line bias module 114 for testing are −0.5, −0.4, −0.3, −0.2, −0.1, 0.0, 0.1, 0.2, 0.3 and 0.4.

As will be described in further detail below, ΔT calculated for the candidate line bias values may be used as a selection parameter to identify a particular candidate line bias of all the candidate line bias values being tested.

In an embodiment, line bias module 114 may use the estimation algorithm to calculate the baseline vector and ΔT for each candidate line bias value. In an embodiment, the estimation algorithm may be a least squares solution. Alternatively, the estimation algorithm may be any of a Bayesian filter (e.g. Kalman filter, Extended Kalman filter, Unscented Kalman filter, a particle filter, etc.) or a non-Bayesian filter (e.g. sequential least-squares, linearized least squares, maximum likelihood estimator, best linear unbiased estimator, etc.). For the example of FIG. 2, let it be assumed that the estimation algorithm is a least squares solution. An example least squares solution may be written as:

$$b = x_B - x_A = (H^T H)^{-1} H^T \phi_{BA}, \qquad (3)$$

where b is the baseline vector;

$x_B$ is the position of the second antenna (e.g., antenna B);

$x_A$ is the position of the first antenna (e.g., antenna A);

H is the design matrix;

T is the transpose operation; and $\phi_{BA}$ is the phase difference between the two antennas (e.g., antenna A and antenna B).

According to the one or more embodiments as described herein, line bias module 114 may correct/adjust each of the fractional Diff-CP values calculated in step 220 based on the candidate line bias value being tested. Stated another way, each of the fractional Diff-CP values are affected by the line bias. As such, the candidate line bias value is removed from each fractional Diff-CP measurement when testing the candidate line bias value. Therefore, minimum values that are output from the estimation algorithm, which is used to test the candidate line bias values, can be utilized to identify the coarse line bias value, i.e., the coarse component ($L_{coarse}$), as will be described in further detail below. In an embodiment, the corrected/adjusted fractional Diff-CP value may be referred to as a corrected fractional Diff-CP value.

For example, let it be assumed that the candidate line bias value being tested is 0.3 and a particular fractional Diff-CP value, of the calculated fractional Diff-CP values, is 0.4. Therefore, line bias module 114 may calculate the corrected fractional Diff-CP value as 0.1 (e.g., 0.4-0.3). Line bias module 114 may similarly calculate a corrected fractional Diff-CP value for each of the other calculated Diff-CP values in the observation window. Therefore, in this example, the line bias module 114 calculates 4 corrected fractional Diff-CP values.

The corrected fractional Diff-CP values may be the input to the estimation algorithm e.g., the least squares solution of formula (3), to test the line bias value of 0.3. Line bias module 114 may execute the estimation algorithm using these values to test the candidate line bias value of 0.3.

In an embodiment, the output from the execution of the estimation algorithm for testing a candidate line bias value may include:

A baseline vector (e.g., ΔX, ΔY, ΔZ);

ΔT (i.e., fine line bias that is a correction to the line bias); and residuals for the values (e.g., corrected fractional Diff-CP values) provided as input to the estimation algorithm.

If the candidate line bias value is the correct coarse line bias value, it would be expected that ΔT (e.g., the correction to the line bias being tested) would be a small value and less than the coarse search step size (e.g., 0.1). As such, a decreasing calculated ΔT indicates a more accurate candidate coarse line bias value. However, an increasing calculated ΔT indicates a more inaccurate candidate coarse line bias value.

Referring back to FIG. 2, the procedure 200 optionally continues from step 225 to step 230. At optional step 230, line bias module 114 stores ΔT and a sum of residual squares for each candidate line bias value.

As explained above, two of the outputs from the estimation algorithm for testing a particular candidate line bias value may be (1) ΔT and (2) residuals for the values (e.g., corrected fractional Diff-CP values) that are provided as input to the estimation algorithm. Therefore, and in this example, each of the 9 calculated ΔT values may be stored. Additionally, line bias module 114 may sum the squares of all residuals for a particular candidate line bias value. In an embodiment, residuals may be computed in the observation domain or may be calculated in a parity space following a transformation. Therefore, line bias module 114 may compute 9 sum of residual squares that are stored. In an embodiment, the 9 calculated ΔT values and the 9 sum of residual squares may be stored in memory of the receiver (not shown), storage of receiver 104 (not shown), and/or external memory (not shown).

Table 2 below, for a particular frequency group (e.g., GPS L1CA/L1C, GAL E1, BDS B1C), includes example ΔT values, example sum of residual squares that are calculated, and sum of residual squares ratio values for the candidate line bias values.

TABLE 2

| Candidate Line Bias Value | ΔT | Sum of Residual Squares | Sum of Residual Squares Ratio |
|---|---|---|---|
| −0.5 | 0.009 | 0.005 | 1.25 |
| −0.4 | 0.040 | 0.004 | 1 |
| −0.3 | 0.020 | 0.009 | 2.25 |
| −0.2 | 0.008 | 0.015 | 3.75 |
| −0.1 | 0.060 | 0.020 | 5 |
| 0.0 | 0.030 | 0.015 | 3.75 |
| 0.1 | −0.020 | 0.030 | 7.5 |
| 0.2 | −0.040 | 0.040 | 10 |
| 0.3 | −0.050 | 0.005 | 1.25 |
| 0.4 | −0.010 | 0.009 | 2.25 |

Considering the example above, let it be assumed that the correct candidate coarse line bias value is −0.5. When observing ΔT alone, candidate coarse line bias value of −0.2 is the candidate line bias value with a corresponding smallest ΔT (e.g., smallest absolute value of ΔT). Therefore, using just ΔT as a selection parameter would lead to the selection of the wrong candidate coarse line bias value of −0.2. When observing the sum of residual squares, it can be observed that the candidate coarse line bias value of −0.2 has a corresponding large sum of residual squares value of 0.015, thus indicating that the candidate coarse line bias value of −0.2 is not a good choice for selection. Further, the candidate coarse line bias value of −0.4 has a corresponding smallest sum of residual squares value of 0.004. However, and for this example, the candidate coarse line bias value of −0.4 is not the correct candidate line bias value. Instead, and as indicated above, the correct candidate coarse line bias value, e.g., coarse line bias component, for this example is −0.5. Therefore, ΔT values and the sum of residual squares ratio values cannot be used, individually, to select the correct candidate coarse line bias value. Instead, and as will be described in further detail below in relation to FIG. 2, ΔT values together with the sum of residual square ratio values can be used to select the correct candidate coarse line bias value (e.g., correct coarse component of the line bias) of −0.5 according to the one or more embodiments as described herein.

Specifically, line bias module 114 may utilize the ΔT values and sum of residual squares to identify a particular candidate coarse line bias as being the correct coarse component of the line bias between antenna A and antenna B of multi-antenna array 106.

Referring back to FIG. 2, the procedure 200 continues from step 230 to step 235 or from step 225 to step 235 when optional step 230 is not performed. At step 235, line bias module 114 selects a subset of the candidate line bias values based on a test statistic method. In an illustrative embodiment, the test statistic method is a sum of squared-residual based method. In alternative embodiment, the test statistic method may be a solution separation method or any other test statistic method. In an embodiment, the subset includes one or more of the candidate line bias values being tested.

For this example, let it be assumed that the test statistic method being used is a sum of squared-residual based method. If the candidate line bias value is incorrect, it is expected that the sum of the residual squares corresponding to the candidate line bias value will be a large value. However, if the candidate line bias value is correct, it is expected that the sum of the residual squares corresponding to the candidate line bias value will be a small value.

In an embodiment, line bias module 114 may calculate a ratio value for a candidate coarse line bias value by dividing the sum of residual squares for the candidate line bias value by the smallest sum of residual squares. Specifically, the smallest sum of residual squares may correspond to a particular candidate coarse line bias value and represent a reference value. By dividing each sum of residual squares by the reference value, line bias module 114 can quantify how different each sum of residual squares, corresponding to a different candidate coarse line bias value, is from the reference value.

As an example, the sum of the residual squares in Table 2 above for candidate coarse line bias value of 0.3 is 0.005. Line bias module 114 may compute the ratio value for the candidate coarse line bias value of 0.3 by dividing 0.005 by the smallest sum of residual squares. In this example, and as indicated in Table 2, the smallest sum of residual squares is 0.004 that corresponds to candidate coarse line bias value of −0.4. Therefore, and for candidate coarse line bias value of 0.3, line bias module 114 may calculate the ratio value as 1.25 (e.g., 0.005/0.004). Line bias module 114 may similarly calculate a ratio value for each of the other candidate coarse line bias values.

In an embodiment, line bias module 114 selects a subset (e.g., one or more) of the candidate coarse line bias values with a corresponding ratio value that is less than a predetermined threshold value. In an embodiment, the predetermined threshold value represents an acceptable deviation from the reference value that is represented by the smallest sum of residual squares. The predetermined threshold value may be any value that is preconfigured or user-defined. In an embodiment, the predetermined threshold value is 1.5. For the example of FIG. 2 and as indicated in the table above, the ratio values corresponding to candidate coarse line bias values of −0.5, −0.4, and 0.3 are less than the predetermined threshold value of 1.5.

Referring back to FIG. 2, the procedure 200 continues from step 235 to step 240. At step 240, line bias module 114 identifies a candidate line bias value, from the subset selected in step 235, that has a corresponding smallest ΔT. In this example, and as indicated in Table 2, the ΔTs for candidate coarse line bias values of −0.5, −0.4, and 0.3 are 0.009, 0.040, and −0.05, respectively. Therefore, line bias module 114 may determine that 0.009 is the smallest ΔT (e.g., smallest absolute value of ΔT) and corresponds to the candidate coarse line bias value of −0.5. In an embodiment, line bias module 114 may determine that the identified candidate coarse line bias value from the subset with the smallest ΔT is the most accurate estimation of the coarse component ($L_{coarse}$) of the line bias between the two antennas.

In the example described herein, the candidate coarse line bias values include: −0.5, −0.4, −0.3, −0.2, −0.1, 0.0, 0.1, 0.2, 0.3, and 0.4. As such, line bias module 114 determines that the candidate coarse line bias value of −0.5 is the most accurate estimation of the coarse component ($L_{coarse}$) of the line bias between antenna A and antenna B of multi-antenna array 106.

The procedure continues to step 245 and line bias module 114 adds the value of ΔT to the identified coarse line bias estimate (e.g., the selected candidate coarse line bias value in step 240) to accurately estimate the line bias for the two antennas of multi-antenna array 106.

As such, line bias module 114 adds the value of ΔT, which is 0.009 and represents a correction to the line bias, to the coarse component of −0.5. As such, $L_{B-A}$ in this example is −0.491 (e.g., −0.5+0.009). Therefore, the line bias ($L_{B-A}$) between antenna A and antenna B of multi-antenna array 106 is estimated as the sum of (1) the candidate coarse line bias value identified in step 240 and (2) ΔT corresponding to the candidate coarse line bias value identified in step 240.

The procedure continues to step 250 and line bias module 114 evaluates the residual values using the estimated line bias to reject outlier residual values. The residual values may be evaluated for one or more epochs. In an embodiment, line bias module 114 utilizes the estimation algorithm to obtain the residual values. Specifically, and as explained above, the estimation algorithm may be the least squares solution of formula (3). According to the one or more embodiments as described herein, line bias module 114 may use the fractional Diff-CP values (e.g., without adjustments/corrections) to form the misclosures used in the least squares solution formula (3). Additionally, the line bias value of −0.491 (e.g., $L_{B-A}$) may be used to determine the value of $\phi_{BA}$ of the least squares solution of formula (3). Line bias module 114 may execute the estimation algorithm using these values to obtain the residual values and then reject the outlier residual values in a known manner.

The procedure then optionally reverts back to step 215 and the procedure may be performed for a different frequency group. As such, the procedure 200 can be iteratively repeated until an accurate estimate of the line bias is determined for each frequency group (e.g., 1 through 5). The procedure ends at step 255.

Therefore, the one or more embodiments as described herein can determine a line bias value without knowing, for example, the attitude of multi-antenna array 106. The line bias module 114 can determine, e.g., estimate, a line bias for any respective pairs of antennas of multi-antenna array 106. For example, a particular antenna of multi-antenna array 106 may act as a reference antenna and the line bias module 114 may determine the line bias between each other antenna and the reference antenna as described above in relation to FIG. 2.

By accurately and efficiently estimating one or more line biases without knowing the attitude of the antenna, the one or more embodiments as described herein provide an improvement in the existing technological field of multi-antenna arrays that receive navigation signals. That is, determining a line bias is a problem specifically related to multi-antenna arrays.

As will be described in further detail below with relation to FIG. 3, line bias module 114 may calibrate multi-antenna array 106 using an estimated line bias and estimate an attitude of multi-antenna array 106 using the determined baseline vector. Therefore, the one or more embodiments as described herein can calibrate multi-antenna array 106 without knowing the attitude of multi-antenna array 106.

Figure 3:
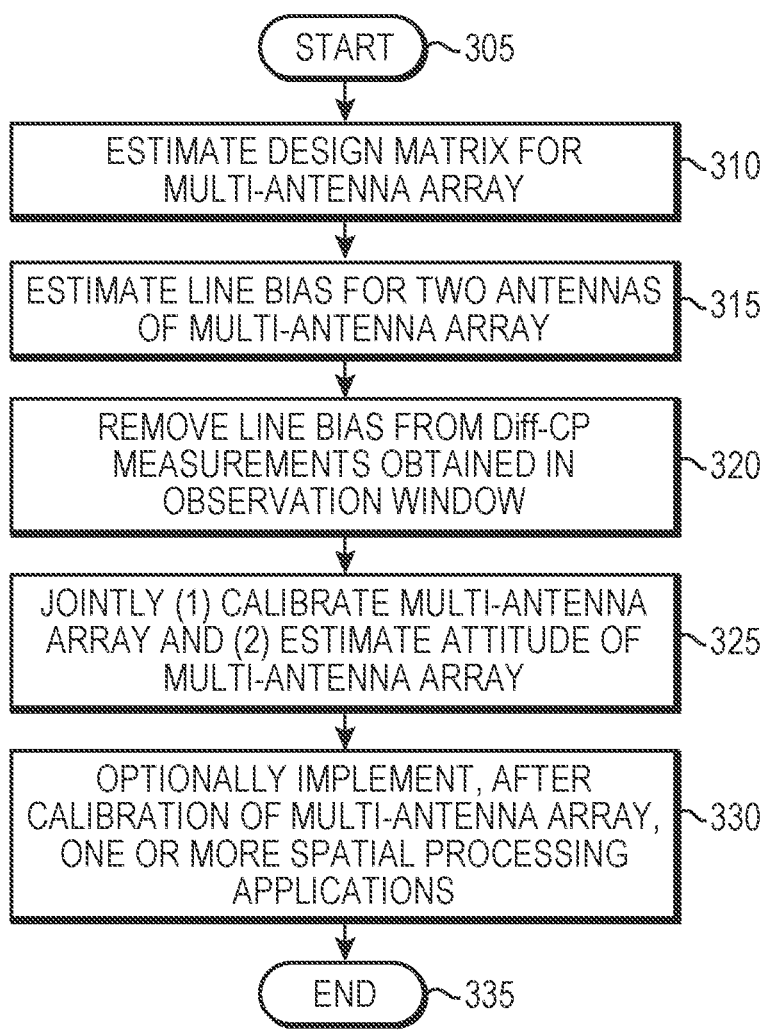
FIG. 3 is a flow diagram of a sequence of steps for jointly calibrating the multi-antenna array and determining the attitude of the multi-antenna array according to the one or more embodiments as described herein.

FIG. 3 is a flow diagram of a sequence of steps for jointly calibrating the multi-antenna array and determining the attitude of the multi-antenna array according to the one or more embodiments as described herein.

The procedure 300 starts at step 305 and continues to step 310 and line bias module 114 estimates a design matrix for multi-antenna array 106. Line bias module 114 may estimate the design matrix in any of a variety of different ways and as known by those skilled in the art.

The procedure continues to step 315 and the line bias module 114 estimates the line bias for two antennas of multi-antenna array 106. In an embodiment, the line bias is estimated as described above in relation to FIG. 2. For example, and as described above in relation to FIG. 2, the accurate line bias between antenna A and antenna B of multi-antenna array 106 is estimated as −0.491.

The procedure continues to step 320 and line bias module 114 removes the line bias from the Diff-CP measurements obtained in the observation window (i.e., time frame). For example, line bias module 114 corrects each Diff-CP measurement obtained in the observation window to account for the line bias that affects each Diff-CP measurement.

The procedure continues to step 325 and line bias module 114 jointly (1) calibrates multi-antenna array 106 using the estimated line bias and (2) estimates the attitude of multi-antenna array 106 using the baseline vector.

As explained above, multi-antenna array 106 calibration may include two parameters. One parameter may be a mismatch relating to a signal delay term, known as a line bias, which may arise from a variety of factors including, but not limited to, radio frequency (RF) hardware, cables, etc. The other parameter may be an uncertainty based on relative phase and gain responses of the antennas within the array. The first calibration parameter is frequency dependent and may vary because of the aging of the internal components and the changes in temperature. The first parameter is, however, independent of the angle of arrival of the signals received at the antenna. The second parameter is dependent on the signal Direction of Arrival (DoA) which is a function of azimuth and elevation angles in the antenna reference frame.

According to the one or more embodiments as described herein, line bias module 114 may use the design matrix to determine, in any of a variety of different ways as known by those skilled in the art, azimuth and elevation angles in the reference frame. This in turn allows line bias module 114 to determine the DoA of the signals that are received at antenna A and antenna B of multi-antenna array 106.

Line bias module 114 may use the determined DoA of the signals and the estimated line bias, determined as described in relation to FIG. 2, to calibrate multi-antenna array 106. Line bias module 114 may calibrate multi-antenna array 106, using the determined DoA of the signals and the estimated line bias, in any of a variety of different ways and as known by those skilled in the art. Advantageously, line bias module 114 can calibrate the multi-antenna array 106 without knowing the attitude of multi-antenna array 106, which is required to be known by some conventional multi-antenna array calibration systems and techniques. As such, the one or more embodiments as described herein also provide an improvement in the existing technological field of multi-antenna array calibration.

In an embodiment, line bias module 114 may determine the attitude of multi-antenna array 106 using the baseline vector as determined above in relation to FIG. 2. Line bias module 114 may determine the attitude of multi-antenna array 106, using the baseline vector, in any of a variety of different ways as known by those skilled in the art.

The procedure continues to step 330 and receiver 104 optionally, after calibration of multi-antenna array 106, implements one or more spatial processing applications. The one or more spatial processing applications may include, but are not limited to, finding, beamforming, attitude estimation, code and carrier multipath mitigation, fast and reliable PPP solutions, etc. The procedure then ends at step 335.

It should be understood that a wide variety of adaptations and modifications may be made to the techniques. For example, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A navigation system for estimating a line bias between two antennas of a multi-antenna array having a plurality of antennas, the system comprising:

the multi-antenna array having a first antenna and a second antenna each configured to receive navigation signals; and a navigation receiver configured to:

calculate a selected number of differential measurements from (1) first measurements obtained in an observation window based on the navigation signals received at the first antenna and (2) second measurements obtained in the observation window based on the navigation signals received at the second antenna;

remove an integer portion from each of the differential measurements to produce a plurality of fractional differential measurements;

calculate a baseline vector estimate and a fine line bias estimate for each of a plurality of candidate line bias values by executing an estimation algorithm that uses (1) each of the plurality of candidate line bias values with (2) the plurality of fractional differential measurements that are adjusted for a corresponding candidate line bias value;

select a subset of the plurality of candidate line bias values based on a sum of residuals that is calculated by the execution of the estimation algorithm, wherein the subset includes one or more of the plurality of candidate line bias values;

identify a particular candidate line bias value, from the subset, based on a determined smallest fine line bias estimate; and calculate the line bias between the first antenna and the second antenna as the sum of (1) the particular candidate line bias value and (2) the determined smallest fine line bias estimate corresponding to the particular candidate line bias value.

2. The system of claim 1, wherein the first measurements and the second measurements are carrier phase measurements.

3. The system of claim 1, wherein a spacing between the first antenna and the second antenna is less than half a carrier wavelength.

4. The system of claim 1, wherein the estimation algorithm is a Bayesian filter or a non-Bayesian filter.

5. The system of claim 1, wherein the differential measurements are single difference measurements between respective pairs of the first and second measurements.

6. The system of claim 1, wherein the receiver is further configured to:

jointly calibrate the multi-antenna array and estimate an attitude of the multi-antenna array.

7. The system of claim 6, when estimating the attitude of the multi-antenna array, the receiver is further configured to:

use the baseline vector estimate to estimate the attitude of the multi-antenna array.

8. The system of claim 1, wherein the receiver is further configured to implement one or more spatial processing applications.

9. The system of claim 8, wherein the one or more spatial processing applications include one or more of direction of arrival estimation, beamforming, and attitude determination.

10. A method for estimating a line bias between two antennas of a multi-antenna array having a plurality of antennas, the method comprising:

calculating a selected number of differential measurements from (1) first measurements obtained in an observation window based on navigation signals received at a first antenna of the multi-antenna array and (2) second measurements obtained in the observation window based on the navigation signals received at a second antenna of the multi-antenna array;

removing an integer portion from each of the differential measurements to produce a plurality of fractional differential measurements;

calculating a baseline vector estimate and a fine line bias estimate for each of a plurality of candidate line bias values by executing an estimation algorithm that uses (1) each of the plurality of candidate line bias values with (2) the plurality of fractional differential measurements that are adjusted for a corresponding candidate line bias value;

selecting a subset of the plurality of candidate line bias values based on output of a test statistic method, wherein the subset includes one or more of the plurality of candidate line bias values;

identifying a particular candidate line bias value, from the subset, based on a determined smallest fine line bias estimate; and calculating the line bias between the first antenna and the second antenna as the sum of (1) the particular candidate line bias value and (2) the determined smallest fine line bias estimate corresponding to the particular candidate line bias value.

11. The method of claim 10, wherein the first measurements and the second measurements are carrier phase measurements.

12. The method of claim 11, wherein a spacing between the first antenna and the second antenna is less than half a carrier wavelength.

13. The method of claim 10, wherein the estimation algorithm is a Bayesian filter or a non-Bayesian filter, the test statistic method is a sum of residual squares method, and the output is a sum of residuals that is calculated for each of the plurality of candidate line bias values.

14. The method of claim 10, wherein the differential measurements are single difference measurements between respective pairs of the first and second measurements.

15. The method of claim 10, the method further comprising:

jointly calibrating the multi-antenna array and estimating an attitude of the multi-antenna array.

16. The method of claim 15, when estimating the attitude of the multi-antenna array, the method further comprising:

using the baseline vector estimate to estimate the attitude of the multi-antenna array.

17. The method of claim 10, further comprising implementing at least one spatial processing applications that include one or more of direction of arrival estimation, beamforming, and attitude determination.

18. A non-transitory computer readable medium having software encoded thereon, the software when executed by one or more computing devices operable to:

calculate a selected number of differential measurements from (1) first measurements obtained in an observation window based on navigation signals received at a first antenna of a multi-antenna array and (2) second measurements obtained in the observation window based on the navigation signals received at a second antenna of the multi-antenna array;

remove an integer portion from each of the differential measurements to produce a plurality of fractional differential measurements;

calculate a baseline vector estimate and a fine line bias estimate for each of a plurality of candidate line bias values by executing an estimation algorithm that uses (1) each of the plurality of candidate line bias values with (2) the plurality of fractional differential measurements that are adjusted for a corresponding candidate line bias value;

select a subset of the plurality of candidate line bias values based on output of a solution separation method, wherein the subset includes one or more of the plurality of candidate line bias values;

identify a particular candidate line bias value, from the subset, based on a determined smallest fine line bias estimate; and calculate a line bias between the first antenna and the second antenna as the sum of (1) the particular candidate line bias value and (2) the determined smallest fine line bias estimate corresponding to the particular candidate line bias value.

19. The non-transitory computer readable medium of claim 18, wherein the line bias is frequency dependent and calculated for a first frequency, and wherein the software when executed by the one or more computing devices is further operable to calculate a different line bias between the first antenna and the second antenna for a second frequency that is different from the first frequency.

20. The non-transitory computer readable medium of claim 18, wherein the navigation signals are from a plurality of different constellations of transmitters that transmit the navigation signals on a same frequency.

21. The non-transitory computer readable medium of claim 18, wherein the software when executed by the one or more computing devices is further operable to:

form misclosure values from a plurality of first measurements;

determine, using the line bias, a phase difference between the first antenna and the second antenna;

execute the estimation algorithm using the misclosure values and the phase difference;

obtain, based on the execution of the estimation algorithm, residual values; and identify one or more of the residual values as outlier residual values that are not to be used.

\* \* \* \* \*